Nov. 12, 1940.  F. M. GUNN ET AL  2,221,187
ASSEMBLING AND WELDING CAR FRAME SIDES
Filed June 9, 1938  5 Sheets-Sheet 5
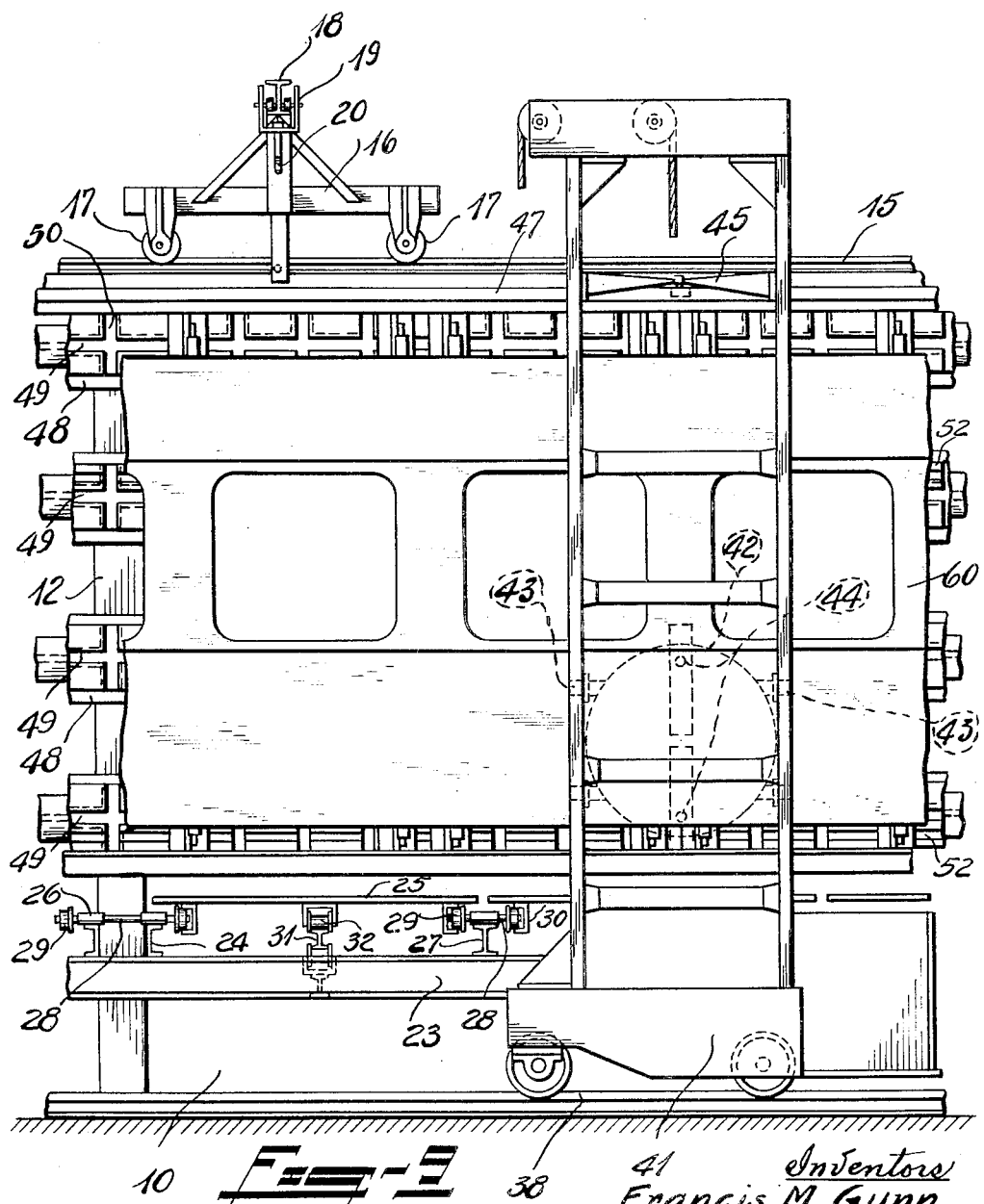

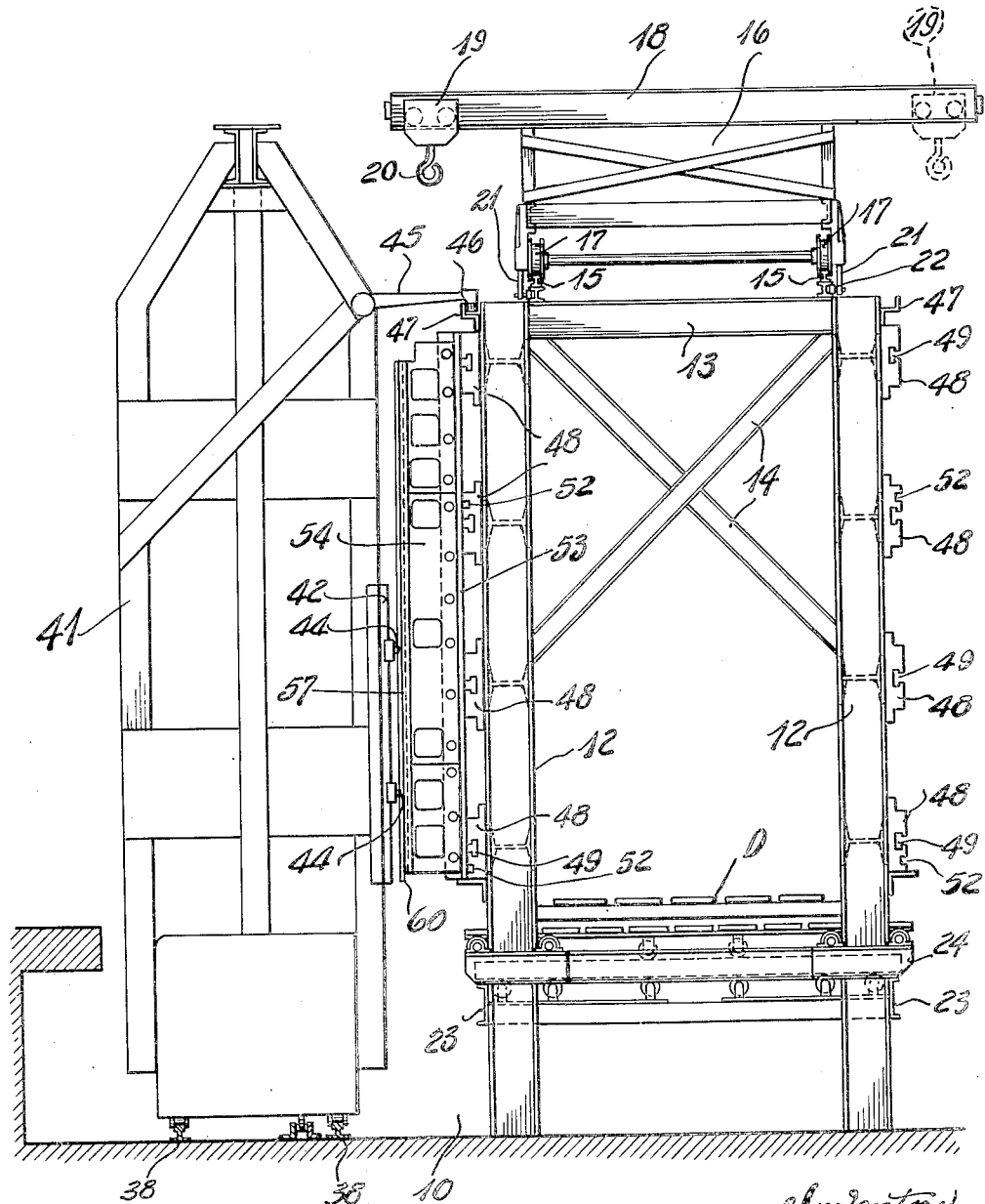

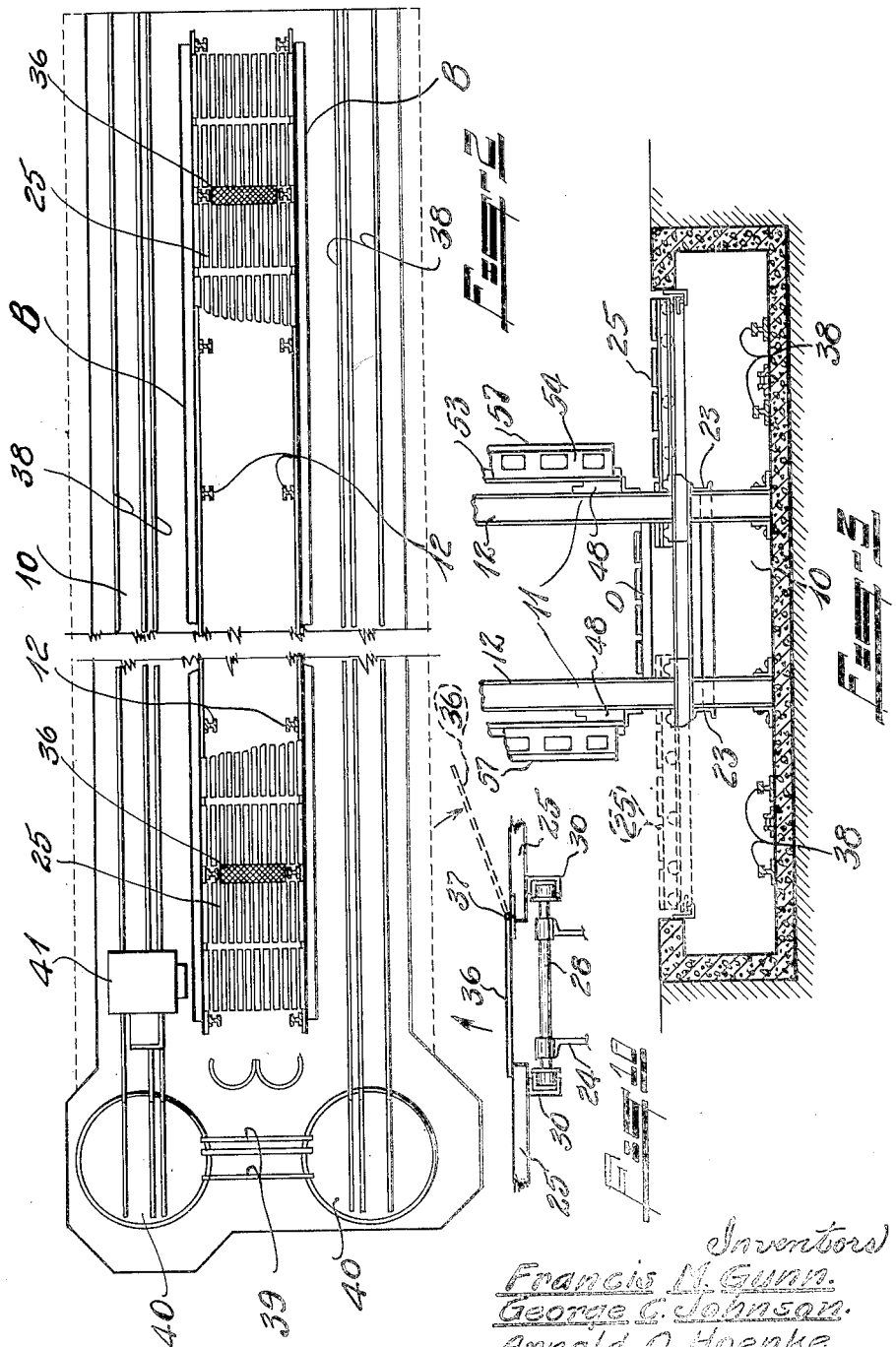

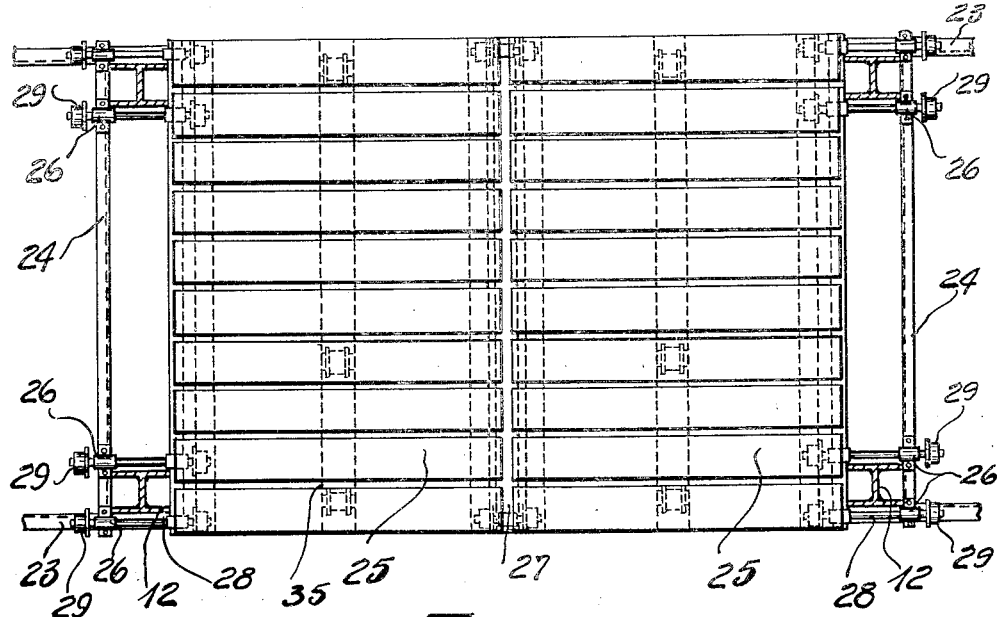
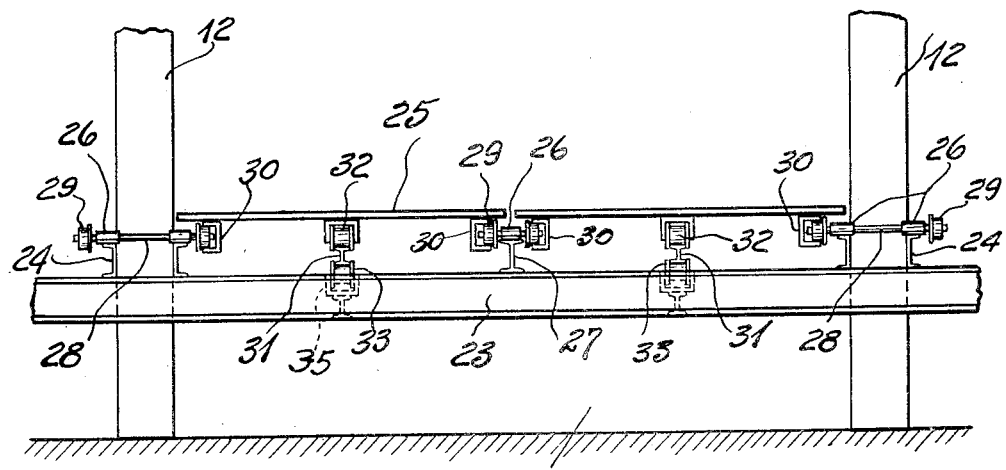

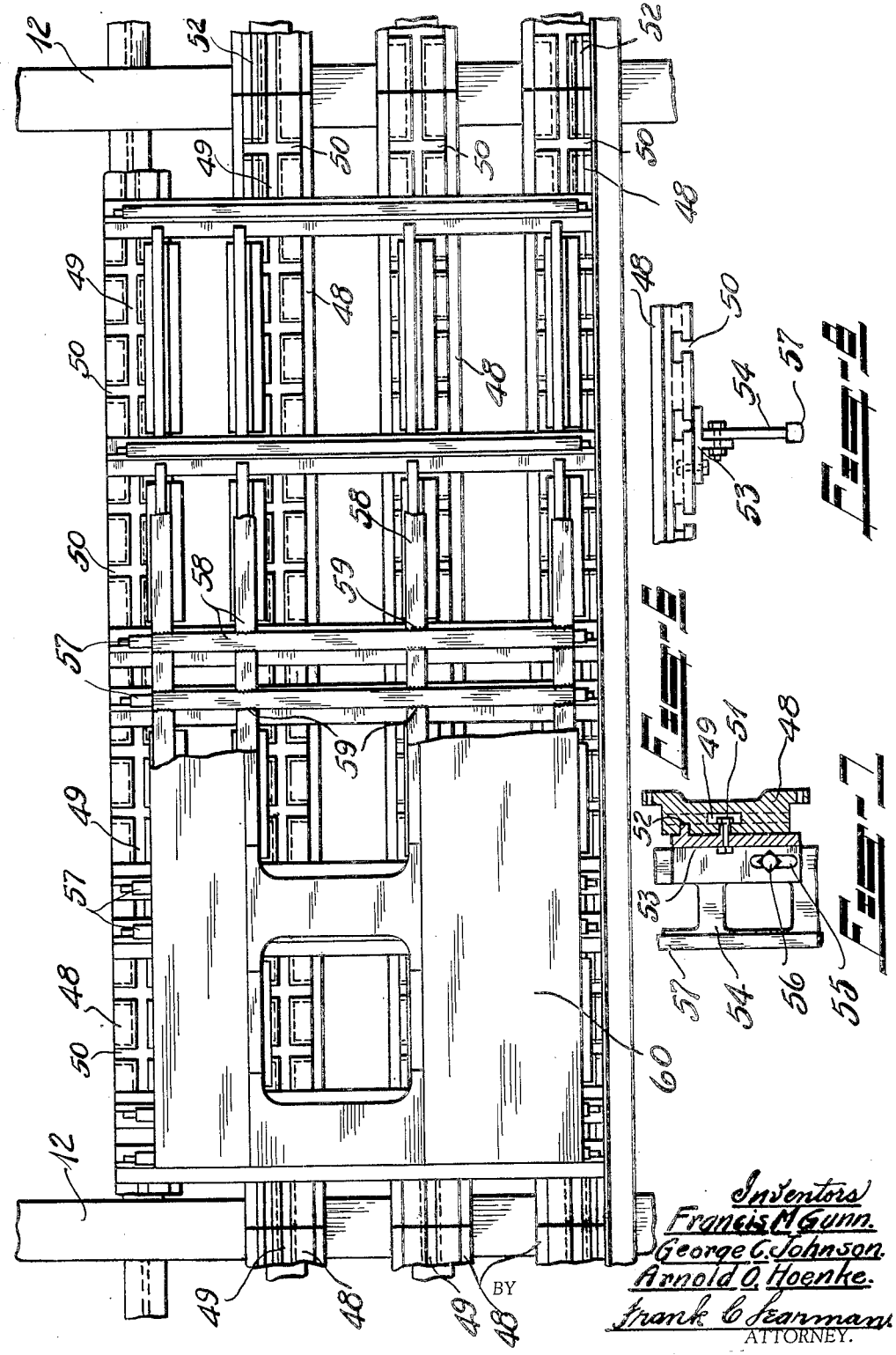

Patented Nov. 12, 1940

2,221,187

UNITED STATES PATENT OFFICE 2,221,187

ASSEMBLING AND WELDING CAR FRAME SIDES

Francis M. Gunn, George C. Johnson, and Arnold O. Hoenke, Chicago, Ill.

Application June 9, 1938, Serial No. 212,636

5 Claims. (Cl. 219—4)

The invention relates to methods of assembling and welding car frame sides, and has for its object to provide a rigid jig structure having means on the side thereof on which the framing of the side of a passenger car or the like may be assembled and held during the welding operation, so the car side may be completed and faced with all of the window and door outlines therein, for the final assembly of the sides or the sections forming the sides into a finished railway car.

A further object is to provide the jig supporting frame with jigs on opposite sides thereof and a traveling welding machine mounted on a track extending around the jig frame so a welding operation may take place on one side of the frame when a car side is being assembled on the opposite side, thereby allowing a continuous welding operation.

A further object is to provide the upper end of the traveling welding machine with interengaging means, longitudinally movable on a track on the jig frame for rigidly holding the welding machine during the welding operation.

A further object is to provide a method of assembling and welding car side units wherein the elements of the units are assembled and welded together on a jig frame by a traveling welding machine movable to opposite sides of the jig frame for alternately welding the units.

A further object is to provide the jig frame with transversely movable platform panels, which may be extended beyond the sides of the jig frame out of the path of the welding carriage for supporting workmen and material during the assembling of the unit parts on the sides of the jig opposite to that occupied by the welding carriage.

A further object is to provide extensible supporting slides controlled by the movable platform panels for supporting and bracing the panels when extended.

A further object is to provide a hoisting carriage above the jig frame, and to which hoisting blocks may be attached for handling the parts of the side units during the assembling operation and the side units when completed.

A further object is to mount the jig frame and traveling welding machine in an elongated pit having tracks at opposite sides thereof on which the welding machine moves and connecting means between the tracks at the ends of the pit for shifting the welding machine from one side to the other of the jig frame.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Fig. 1 is a transverse sectional view through the pit, showing the jig frame in end elevation and the traveling welding machine to one side thereof.

Fig. 2 is a top plan view of the jig frame and pit.

Fig. 3 is a transverse sectional view through the jig frame and pit, showing one of the platform panels extended and the other extended position of the platform panel in dotted lines.

Fig. 4 is a side elevation of a portion of the jig frame showing the movable platform panels in end elevation.

Fig. 5 is a top plan view of Fig. 4.

Fig. 6 is an enlarged side elevation of a portion of one side of the jig frame, showing elements of a car side assembled thereon, parts being broken away to more clearly show the assembly.

Fig. 7 is an enlarged detail sectional view transversely through one of the horizontal slotted jig bars.

Fig. 8 is a fragmentary top plan view thereof.

Fig. 9 is an enlarged side elevation of a portion of one side of the jig frame, showing elements of a car side assembled thereon, and the traveling welding machine in position, the broken lines indicating the welding head.

Fig. 10 is an enlarged detail showing the hinged plates between certain of the platform panels, the broken lines showing the hinged section being swung back so that the panel may be moved.

Referring now to the drawings, the numeral 10 designates an elongated pit in which the jig frame 11 is disposed. The jig frame 11 comprises a plurality of pairs of spaced columns 12, the upper ends of which are connected together by cross beams 13; and the transversely spaced columns 12 are further braced by crossed brace bars 14 as clearly shown in Fig. 1. Disposed on the upper side of the jig frame 11 are spaced rails 15, on which rails are mounted a longitudinally movable hoisting carriage 16, this hoist-carriage arrangement, however, being for illustrative purposes only, as it will be understood that the hoisting mechanism can be mounted on the roof beams of the shop (not shown) in which the mechanism is installed, or it may form part of a trolley arrangement movable on a conventional I-beam track as usual.

Carriage 16 is provided with flanged wheels 17 which rotate on the rails 15. Extending transversely of the carriage 16, with its ends projecting beyond the sides of the frame 11, is a beam 18 on the outer ends of which are mounted traveler blocks 19 having eyes 20 for the reception of a hoisting block mechanism for hoisting the various parts to position to be assembled on the sides of the frame, and for removing the finished car siding or unit after the welding operation. The opposite sides of the carriage 16 are provided with downwardly extending arms 21 having rollers 22 engaging under the upper outer flanges of the rails 15 and preventing a tilting of the carriage 16 when a load is supported from the ends of the beam 18 at either side of the frame 11.

Extending longitudinally of the frame 11 and connecting the columns 12, adjacent their lower ends, are channel bars 23, which channel bars are cross connected by transverse channel bars 24, which are in turn connected to the columns 12, and a stationary platform D is provided between the columns 12 and forms a part of the frame 11; therefore it will be seen that a rigid frame structure is provided, and which structure supports transversely movable platform panels 25, as clearly shown in Fig. 4 of the drawings.

Rotatably mounted in bearings 26 carried by the channels 24 and an I-beam 27 are shafts 28 having flanged wheels 29 on their ends. The flanged wheels 29 extend into channels 30 carried by the adjacent edges of the platform panels 25; therefore it will be seen that the panels can be transversely extended beyond either side of the jig frame 11 for supporting workmen in assembling the parts of a car side on the jig, hereinafter set forth, on either side of the frame. To brace the extended platform panels slidable extension bars 31 are provided between the flanged rollers 32, carried by the under sides of the platforms, and the flanged rollers 33, carrier by the lower channel members 35, connecting opposite bars 23 of the frame.

Referring to Fig. 10, it will be seen that relatively narrow plates 36 may be placed over the spaces between adjacent platform panels and between the transversely aligned columns 12, said plates being hinged to one of the panels as at 37 so that it may be swung up and onto the face of the adjacent panel when the panels are being moved and then swung down again when the panel is in proper position; therefore, it will be seen there is no danger of injury to a workman on any panel when the panels are in their predetermined positions, as shown in Fig. 2.

Disposed within the pit 10 on opposite sides of the jig frame 11 are trackways 38 which parallel the frame, one or both ends being cross connected by a short trackway 39 and by conventional turn tables 40. Mounted on one of the trackways is a wheel supported traveling welding machine 41, adapted to be moved longitudinally when welding a horizontal seam. The welding machine 41 has a rotatable welding head 42 of conventional form, and the welding head, as a whole, is vertically movable on guide wheels 43. Such a traveling welding machine with a rotatable welding head is shown in the application of Messrs. Kaunitz, Gunn and Boles, for "Welding apparatus," Serial # 151,368, filed the 1st day of July, 1937, since matured into Patent No. 2,177,831, dated Oct. 31, 1939, however, the welding head in its upward movement will weld vertical seams and the longitudinal seams are welded on the longitudinal movement of the welding machine as a whole.

To hold the upper end of the welding machine 41 rigidly against outward movement during the welding operation when pressure is applied to the electrodes 44, a hinged arm 45 is provided at the upper end of said welding machine, and which arm terminates in a roller 46 disposed behind the flange 47 of a Z-bar extending longitudinally along each side of the frame at opposite sides thereof as clearly shown in Fig. 1; hence it will be seen that the welding machine will be positively held against outward movement during the welding operation, and at the same time will be similarly held during the welding of longitudinal seams, at which time the welding machine is moved longitudinally.

A jig structure B is secured to opposite sides of the jig frame 11 and includes longitudinally extending spaced horizontal jig bars 48, which bars are provided with longitudinally extending T-shaped slots 49 and vertically disposed T-shaped slots 50 for the reception of the heads of T-bolts 51, as shown in Fig. 7 for assembling the framing of the side of a passenger railroad car for a welding operation, so all the parts can be welded together with the window and door openings and the car side finished as a unit, for assembling with other parts for a finished car.

It will be noted that certain of said jig bars 48 are also provided with additional slots 52, providing keyways for aligning the removable backing piece T 53 on which the sectional vertical bar 54 is adjustably mounted, slots 55 being provided in said backing T and accommodating bolts 56 to permit adjusting of these vertical and horizontal members in accordance with the particular work to be done.

A vertical copper strip 57 is secured to the face of and serves to unite the member 54 and function as conductors between the welding electrodes 44, and similar conductor bars are provided on the horizontals 53 for the same purpose.

The car framing posts 58 are clamped to these jig frame elements in proper relation and are then arc welded together as at 59 to form the car frame, after which the sheet metal facing 60 is clamped in position by means of suitable clamps (not shown).

By providing jigs on both sides of the jig frame 11, it is obvious that the side framing of the car may be fabricated and the siding elements may be assembled on one side during the welding operation on the other; hence there is no loss of time between each set up, as it will only be necessary to shift the welding machine from one side of the frame to the other and substantially a continuous welding operation can be carried on.

From the above it will be seen that a continuous method of welding car units is provided and that a welding structure is provided on which the units, forming the structure, are rigidly held during the welding operation and a complete finished car side may be fabricated for assembling in the final product.

What we claim is:

1. A combined work holder, tool support and work assembling device comprising a frame, jigs carried by opposite sides of said frame and on which structural units are assembled for alternate tool working operations, a travelling tool to one side of the frame for securing the structural units together, said tool being mounted on a track, said track extending around the frame adjacent thereto and forming means whereby the tool can be shifted from one side of the frame to the other for alternately securing the assembled structural units on the jigs carried by opposite sides of the frame.

2. A device as set forth in claim 1 wherein the trackways and frame are disposed in a pit, and transversely slidable platform means carried by the frame below the jigs and adapted to be extended to either side of the frame for closing the pit to either side thereof beneath the jigs and to the outside thereof.

3. A device as set forth in claim 1 including transversely extensible platforms carried by the frame below the jigs and adapted to be extended beyond the outer sides of the jigs.

4. A device as set forth in claim 1 including a plurality of horizontally disposed extensible platforms transversely movable in the frame beneath the jigs and means whereby said platforms may be shifted from one side of the frame to the other to assume positions beneath and extending to the outside of either jig.

5. A device as set forth in claim 1 including transversely shiftable platforms horizontally disposed and guidable in the frames and adapted to be shifted to extend beyond either jig.

FRANCIS M. GUNN.
GEORGE C. JOHNSON.
ARNOLD O. HOENKE.